United States Patent [19]
Payne

[11] Patent Number: 5,570,680
[45] Date of Patent: Nov. 5, 1996

[54] CONDENSING FURNACE HOT AIR HUMIDIFICATION

[75] Inventor: Peter P. Payne, Park Ridge, Ill.

[73] Assignee: Gas Research Institute, Chicago, Ill.

[21] Appl. No.: 493,358

[22] Filed: Jun. 21, 1995

[51] Int. Cl.$^6$ ........................................... F24F 3/14
[52] U.S. Cl. ...................... 126/113; 126/110 R; 165/913
[58] Field of Search ................................ 126/110 R, 99 R, 126/113, 116 R; 165/903, 901, 911, 913; 237/55, 51, 50

[56] References Cited

U.S. PATENT DOCUMENTS

| | | |
|---|---|---|
| 3,021,831 | 2/1962 | Byrge . |
| 3,033,193 | 5/1962 | Ratham . |
| 3,443,559 | 5/1969 | Pollick . |
| 3,472,496 | 10/1969 | Coleman et al. . |
| 3,491,746 | 1/1970 | Swimmer et al. . |
| 3,592,182 | 7/1971 | Richardson . |
| 3,612,033 | 10/1971 | Chilcoat . |
| 4,028,817 | 6/1977 | Winstel . |
| 4,138,062 | 2/1979 | Graden . |
| 4,175,518 | 11/1979 | Reames, Jr. . |
| 4,241,874 | 12/1980 | Schossow . |
| 4,257,389 | 3/1981 | Texidor et al. . |
| 4,318,367 | 3/1982 | Antonucci . |
| 4,354,985 | 10/1982 | Johnson ................................ 126/113 |
| 4,410,136 | 10/1983 | Oliver, Jr. . |
| 4,485,746 | 12/1984 | Erlandsson . |
| 4,706,884 | 11/1987 | Brauer ................................... 237/55 |
| 4,836,183 | 6/1989 | Okuno et al. ...................... 126/110 R |
| 4,922,890 | 5/1990 | Narang . |
| 4,987,881 | 1/1991 | Narang . |
| 5,075,047 | 12/1991 | Youngeberg .......................... 126/113 |
| 5,184,600 | 2/1993 | Astle, Jr. ............................. 126/113 |

Primary Examiner—James C. Yeung
Attorney, Agent, or Firm—Speckman, Pauley & Fejer

[57] ABSTRACT

Apparatus and process for condensing furnace hot air humidification using aqueous condensate from flue gases generated by the thermal exchanger in the furnace as the primary aqueous input to the evaporator of a humidifier which, preferably, may be integral with the furnace or which may be retrofitted in the field. Use of the system of this invention provides long term reliability and low maintenance to furnace humidification systems.

20 Claims, 1 Drawing Sheet

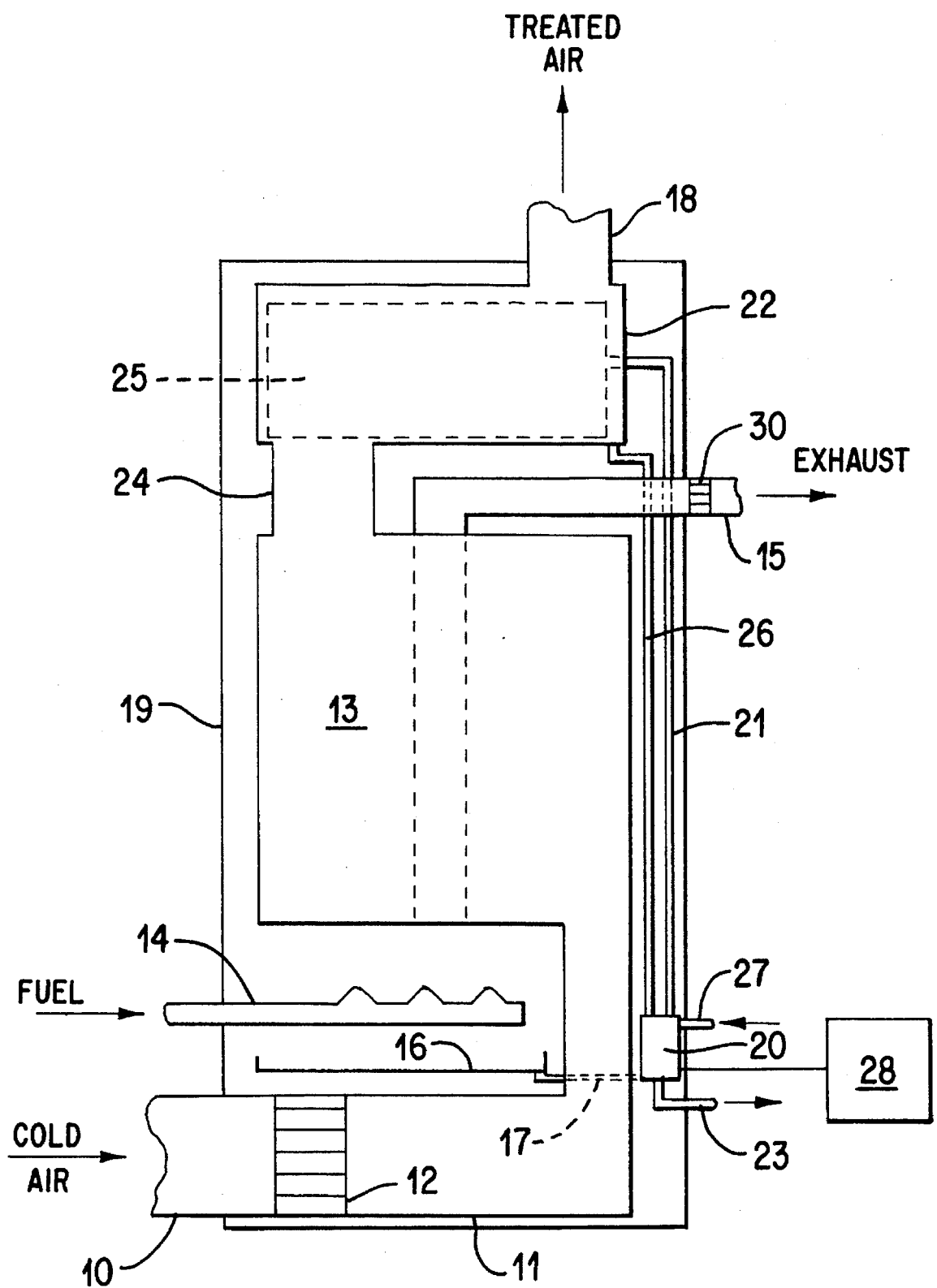

CONDENSING FURNACE HOT AIR HUMIDIFICATION

BACKGROUND OF THE INVENTION

1. Field of the Invention

This invention relates to an apparatus and process for heating, ventilating and humidifying residential and commercial enclosures. This invention utilizes the aqueous condensate from products of combustion in the secondary integral heat exchanger of a high efficiency furnace to humidify the primary heated air passing from the furnace to the conditioned space.

2. Description of Related Art

Heat recovery from hot flue gases for a variety of purposes is known: U.S. Pat. No. 4,138,062 teaches preheating outside air for introduction to the return plenum by indirect thermal exchange with flue gas; U.S. Pat. No. 4,241,874 teaches preheating outside air for combustion by indirect thermal exchange with flue gases; U.S. Pat. No. 4,028,817 teaches preheating outside air for introduction to a dryer by indirect thermal exchange with flue gases of a gas dryer; U.S. Pat. No. 4,485,746 and 4,318,367 teach generation of hot water by indirect thermal exchange with flue gases; and U.S. Pat. No. 4,175,518 teaches preheating incoming cold water to a hot water heater by indirect thermal exchange with flue gases.

Humidification of circulating air in the plenum or warm air duct of a furnace is known: U.S. Pat. No. 3,592,182 teaches evaporation from a sponge in an air-foil shaped water reservoir, supplied by an external water source, in a horizontal warm air duct; and U.S. Pat. Nos. 4,922,890; 4,987,881; 3,612,033; 3,491,746; 3,472,496; 3,033,193; and 3,021,831 teach supply of water from household plumbing to a porous evaporator in a furnace plenum or warm air duct, noting problems caused by minerals in the water. Generation of steam from water supplied from an external source by thermal transfer with hot flue gases and passage of the generated steam into the warm air duct for humidification is taught by U.S. Pat. No. 3,443,559 and 4,257,389, the 4,257, 389 patent noting the problems created by minerals in water from a standard water line and suggesting softening or filtration. U.S. Pat. No. 4,410,136 teaches an annular passage surrounding a furnace flue into the upper portion of which return air is introduced and household water sprayed onto the flue causing evaporation of the water, thereby humidifying the air, with condensation from the flue being drained from the system. U.S. Pat. No. 4,706,884 teaches a flue gas heat exchanger in the return duct of a hot air furnace which collects condensation from the flue gases and its use for humidification in the return air duct or in the warm air duct. The U.S. Pat. No. 4,706,884 points out a serious problem with the disclosed system being that the return duct is under a negative pressure with respect to the flue gas heat exchanger, and thus, any leaks would pass from the flue gas heat exchanger into the return air, which would be intolerable from a practical safety standpoint. Retrofit of the unit disclosed by the U.S. Pat. No. 4,706,884 may also affect the combustion process of the furnace design.

In view of increasing fuel costs in recent years, high efficiency, or condensing, furnaces have gained widespread use due to their efficiency of about 90 percent plus. The high efficiency furnace has a very efficient thermal exchanger downstream of the combustion burners providing highly efficient indirect thermal exchange between the gases formed by combustion and the air being heated. Since water is a product of combustion, the highly efficient thermal exchange results in sufficient cooling of the gases formed by combustion to form considerable aqueous condensation. Conventionally, the condensed water is drained from the furnace and discharged through a household drain.

SUMMARY OF THE INVENTION

Lack of humidification in hot air heating systems is a common problem in colder climates causing: increase of the thermal setpoint to offset reduced enthalpy and maintain comfort; dry skin and hair; respiratory problems, static electricity with the potential for failure of electronic equipment; clinging of dust to surfaces or fabric to people; drying and shrinking of wood furniture, floors, and trim; and increased risk of biological infection or viral exposure resulting from their greater survival at lower humidities. Currently used humidification systems using untreated household water, when the supply water is hard, results in mineral precipitation clogging nozzles, tubes, and evaporators. Such solids may also enter the air stream and deposit a layer of white dust. When household water is softened by ion exchange, the residue increases which aggravates problems associated with humidifiers. Special treatment of the water can be implemented, which is sometimes done in commercial and industrial applications, but is expensive and requires routine maintenance. To date, no reliable and maintenance-free approach to humidification has been devised.

It is an object of this invention to overcome prior problems caused by mineral content of water supplied to humidifiers in hot air heating systems.

It is another object of this invention to provide a highly efficient, low installation and low maintenance cost humidification system for hot air heating systems.

Yet another object of this invention is to provide a high efficiency, condensing furnace hot air humidification system which may be build into the original furnace or may be easily retrofitted to an existing high efficiency, condensing furnace.

The above advantages of this invention are achieved by use of water condensed from flue gases in a high efficiency, condensing furnace for humidifying air warmed by the furnace for circulation to an enclosed space. High efficiency, condensing furnaces have a secondary thermal exchanger integral to the design of the furnace that is located just downstream of the burners which provides high efficiency indirect heat transfer between hot flue gases and air being heated by the furnace. Substantial cooling of the flue gases in the secondary thermal exchanger results in generation of aqueous condensate which, prior to this invention, has been drained from the furnace. According to this invention, the aqueous condensate generated by the secondary thermal exchanger is passed to an evaporator over which air heated by the furnace is passed for humidification. By this method, humidity may be added to the heated air circulated to an enclosed space at all times that the furnace is operating without the requirement of water supply connection to a household water line. Further, use of the aqueous condensate from the furnace flue gases greatly reduces, or eliminates, problems of mineral formation in the humidifier, since the condensate does not contain minerals as are present in most household water supplies. Mineral deposition in various types of evaporators has been a serious problem in reduction of efficiency of presently used humidifiers.

Humidification systems of this invention may be constructed integrally with a hot air furnace by the furnace manufacturer wherein the furnace unit contains the entire humidification apparatus, providing complete comfort control in a single factory assembled unit. Such an integral air heating and humidification treatment system provides utilization of a single designed system in which one component would not interfere with another, which provides factory manufacture and assembly control of a humidification system which utilizes internally produced water and which would reduce installation and maintenance costs.

Humidification systems of this invention may also be retrofitted in the field to an existing high efficiency, condensing furnace for hot air humidification. The aqueous condensate produced by the secondary thermal exchanger of the furnace, which is customarily collected for drainage, may be pumped to an evaporator in the stream of air heated by the furnace for introduction to the hot air being passed to the enclosed space. Use of the aqueous condensate produced from flue gases in the secondary thermal exchanger provides very low mineral-containing water to the humidifier, thereby increasing long term reliability and efficiency of the humidifier with little or no maintenance.

In like manner, an existing humidification system installed on a high efficiency condensing furnace may be modified to take advantage of this invention by directing the aqueous condensate produced by the secondary thermal exchanger to the water input of an existing humidifier in the hot air duct.

BRIEF DESCRIPTION OF THE DRAWING

The above and further advantages of this invention will be apparent from more detailed description of preferred embodiments with reference to the drawing, wherein:

The FIGURE is a highly schematic showing of one embodiment of this invention constructed integrally with a hot air furnace.

DESCRIPTION OF PREFERRED EMBODIMENTS

FIG. 1 shows highly schematically an embodiment of this invention having a humidifier constructed integrally with a hot air condensing furnace. High efficiency, condensing furnaces for heating air are well known to the art for residential, commercial and industrial heating. This invention is applicable to any type of such furnace which generates an aqueous condensate by thermal exchange between cool treatment air and hot flue gases. Portions of a conventional high efficiency, condensing furnace are shown having cold air inlet duct 10 with treatment air blower 12 passing air to be treated through treatment duct 11 to a pathway through thermal exchanger 13 which warms the treatment air by indirect thermal exchange with hot flue gases formed by combustion from burner assembly 14 passing through another pathway of thermal exchanger 13. Cooled flue gases are exhausted from the system by induced draft blower 30 through flue gas exhaust 15. During cooling of the flue gases by thermal exchanger 13, an aqueous condensate is formed which is collected in condensate collector 16, and in conventional systems, drained through condensate drain 17. According to this invention, aqueous condensate passes from condensate collector 16 to pump/valve means 20 which causes passage of the aqueous condensate through condensate feed line 21 to evaporator 25 in humidifier 22. Treatment air warmed in thermal exchanger 13 is passed through warm air conduit 24 to humidifier 22 where it passes in contact with evaporator 25 increasing the moisture content of the warmed air which then passes to warm air plenum 18 for distribution to the enclosed space to be conditioned. Water not evaporated by evaporator 25 may be passed through humidifier drain line 26 to condensate pump/valve means 20 for recycle to evaporator 25 or removed from the system through external drain 23.

Pump/valve means 20 is any mechanically or electrically operated pump which is capable of providing flow of the desired volume of water to evaporator 25 and associated controlled valving to provide recycle of water from humidifier drain line 26, drainage through drain 17 and, if desired, addition of water from an exterior source through water supply line 27. In use, generally, aqueous condensate generated from aqueous-containing flue gases by thermal exchanger 13 is suitable to provide sufficient humidification to a warm air heating system, especially in a fully recirculating mode of operation. However, under extreme, or temporary conditions, it may be desirable to add external water to the system through external water supply line 27. To obtain greatest benefit of use of aqueous condensate not containing the usual salts of household supply water which clog valves and evaporator surfaces, it is preferred to not provide water from the usual untreated household source. However, it is apparent that if a small amount of water from an external source is added to the aqueous condensate pumped to the humidifier that advantages of reduction of salt deposition resulting from this invention will still be obtained. The aqueous condensate generated from the flue gases will generally be acidic, but in view of the temperatures to which components in contact with the aqueous condensate are subjected, any problems of corrosion may be eliminated by use of plastic or other corrosion resistant materials for pump, valve, conduit, and humidifier components. Pump/valve means 20 is controlled by a control means 28 which sends signals, which may include those necessary to start or stop pumping action and to open and close valves to condensate drain 17, external drain 23, humidifier drain line 26, and water supply line 27, as desired to operate the humidifier. Control means 28 may be activated by signals from a furnace control, not shown, turning the burners on and off, together with signals from a humidity sensor which may be located in the closed space being conditioned. The humidity sensor may include a sensor in the cold air return duct or may include a more elaborate sensor system taking into account outside dry bulb temperature for a humidity set point reset to avoid window condensation. As will be apparent to one skilled in the art, any suitable control means and humidity sensing means known to the art may be used in the humidifying system of this invention. An important aspect of this invention is that the operation of the humidification system of this invention may be controlled by controls contained within the furnace system itself and may be factory installed, providing better control of fabrication and design coordination of the entire heating/humidification system.

Humidifier 22 may utilize any system known to the art to transfer moisture from the aqueous condensate to the passing warm air, such as, evaporator means for spraying the aqueous condensate into the warm air path, stationary evaporator means of a distributor providing a high surface area for aqueous condensate passage across the warm air path, and active evaporative means, such as, a rotating wheel or cone through which warm air passes to contact aqueous condensate. Any method for bringing the aqueous condensate into contact with the warm air for efficient evaporation is suitable. A feature of this invention is that use of aqueous condensate, which does not contain the salts normally found in household water supplies, provides more reliable and longer time use of more efficient evaporator means since salt deposition will not clog the evaporator and thus frequent maintenance and exchange of evaporative elements will not be necessary to maintain operation of the humidifier.

As pointed out above, the aqueous condensate is sometimes acidic and, therefore, the components of the humidification system in contact with the aqueous condensate should be fabricated from corrosion resistant materials, such as plastics.

While the above description has related to humidification systems integral with the furnace, it is apparent that this invention may also be applied to retrofit units using field installed humidifiers external to the furnace which use aqueous condensate as the principal aqueous input. In this case, any suitable humidifier may be installed in its usual fashion and pump/valve means 20 connected to the aqueous condensate drain from the furnace with condensate feed line 21 to the evaporator of the humidifier and humidifier drain line 26 from the humidifier overflow in the same manner as shown in the figure.

An important advantage of this invention is that the generation of aqueous condensate takes place at a thermal exchanger location where the air being treated is at a higher positive pressure than the pressure of the flue gases passing through a thermal exchanger. In the event of a leak developing in the thermal exchanger, the air being treated would not be contaminated by introduction of flue gases. This is an important safety consideration, as noted in the prior art where such a thermal exchanger has been located in a return air duct having a lower pressure than the flue gases providing thermal exchange, thus creating a safety hazard in case of a leak in the thermal exchanger.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. An apparatus for heating and humidity conditioning of air for circulation to an enclosed space comprising: a hydrocarbon fuel burner within a combustion chamber, said burner capable of combusting hydrocarbon fuel forming aqueous-containing flue gases; a thermal exchanger having a first pathway for said aqueous-containing flue gases in open communication with said combustion chamber at an upstream end and in communication with a flue gas exhaust at an opposite downstream end, said thermal exchanger having a second pathway for air to be warmed in communication at an upstream end with a blower supplying air to be treated and in communication at an opposite downstream end with a humidifier, said air being warmed and said aqueous-containing flue gases being cooled by passage in indirect thermal exchange relation through said thermal exchanger forming an aqueous condensate; collection means for said aqueous condensate; pump/valve means and conduit means in communication with said collection means at one end and with an evaporator means in said humidifier at the other end, whereby said aqueous condensate is pumped to said evaporator means for direct contact with and humidification of warmed air passing from said thermal exchanger.

2. An apparatus for heating and humidity conditioning according to claim 1 additionally having a drain line from said humidifier to said pump/valve means for recycling excess water from said humidifier.

3. An apparatus for heating and humidity conditioning according to claim 1 additionally having a water supply line to said pump/valve means for supply of external water.

4. An apparatus for heating and humidity conditioning according to claim 1 additionally having a drain from said pump/valve means for draining of water from the system.

5. An apparatus for heating and humidity conditioning according to claim 1 additionally having a drain line from said humidifier to said pump/valve means for recycling excess water from said humidifier, a water supply line to said pump/valve means for supply of external water, and a drain from said pump/valve means for draining of water from the system.

6. An apparatus for heating and humidity conditioning according to claim 5 having control means activated by signals from a furnace control and a humidity sensor to start or stop pumping action and to open or close valves to said drain line from said humidifier, said water supply line, and said drain.

7. An apparatus for heating and humidity conditioning according to claim 1 wherein said evaporator means is a stationary evaporator.

8. An apparatus for heating and humidity conditioning according to claim 1 wherein said evaporator means is an active evaporator.

9. An apparatus for heating and humidity conditioning according to claim 1 wherein all components of said apparatus are in a single integral unit.

10. An apparatus for heating and humidity conditioning according to claim 1 wherein said pump/valve means, said conduit means, and said humidifier are external to the remainder of the components which form the heating portion of said apparatus.

11. In a high efficiency, condensing furnace for heating air for circulation to an enclosed space of the type having a combustion chamber housing a burner capable of combusting hydrocarbon fuel forming aqueous-containing flue gases, a secondary, integral thermal exchanger having a first pathway for said aqueous-containing flue gases in communication with said combustion chamber at an upstream end and in communication with a flue gas exhaust at an opposite downstream end, said thermal exchanger having a second pathway for air to be warmed in communication at an upstream end with a blower supplying air to be treated, said air being warmed and said aqueous-containing flue gases being cooled by passage in indirect thermal exchange relation through said thermal exchanger forming an aqueous condensate, the improvement comprising; pump/valve means and conduit means in communication at one end with a collection means for said aqueous condensate and in communication at an opposite end with evaporator means in a humidifier at the downstream end of said second pathway of said thermal exchanger, whereby said aqueous condensate is pumped to said evaporator means for direct contact with and humidification of warmed air passing from said thermal exchanger, providing humidity conditioning of said air for circulation to said enclosed space.

12. In a high efficiency, condensing furnace according to claim 11 wherein said improvement additionally comprises a drain line from said humidifier to said pump/valve means for recycling excess water from said humidifier.

13. In a high efficiency, condensing furnace according to claim 11 wherein said improvement additionally comprises a water supply line to said pump/valve means for supply of external water.

14. In a high efficiency, condensing furnace according to claim 11 wherein said improvement additionally comprises a drain from said pump/valve means for draining of water from the system.

15. In a high efficiency, condensing furnace according to claim 11 wherein said improvement additionally comprises a drain line from said humidifier to said pump/valve means for recycling excess water from said humidifier, a water supply line to said pump/valve means for supply of external water, and a drain from said pump/valve means for draining of water from the system.

16. In a high efficiency, condensing furnace according to claim 15 wherein said improvement comprises control means activated by signals from a furnace control and a humidity sensor to start or stop pumping action and to open or close valves to said drain line from said humidifier, said water supply line, and said drain.

17. In a high efficiency, condensing furnace according to claim 11 all components are in a single integral unit.

18. A process for heating and humidity conditioning air for circulation to an enclosed space comprising: combusting a hydrocarbon fuel forming aqueous-containing flue gases; passing said aqueous-containing flue gases through a thermal exchanger; passing air to be warmed through a blower and said thermal exchanger downstream from said blower in indirect thermal exchange relation with said aqueous-containing flue gases, thereby cooling said flue gases and forming aqueous condensate from said flue gases; collecting said aqueous condensate and pumping said aqueous condensate to an evaporator in direct contact with warmed air passing from said thermal exchanger, thereby humidifying said warmed air for circulation to said enclosed space.

19. A process for heating and humidity conditioning according to claim 18 wherein said air to be warmed passing through said thermal exchanger is at a higher positive pressure than said aqueous-containing flue gases passing in indirect heat exchange relation with said air through said thermal exchanger.

20. A process for heating and humidity conditioning according to claim 18 wherein said thermal exchanger is a secondary, integral thermal exchanger of a high efficiency, condensing furnace.

* * * * *